(12) United States Patent
Soma et al.

(10) Patent No.: US 9,777,352 B2
(45) Date of Patent: Oct. 3, 2017

(54) OIL-WELL STEEL PIPE HAVING EXCELLENT SULFIDE STRESS CRACKING RESISTANCE

(75) Inventors: Atsushi Soma, Tokyo (JP); Tomohiko Omura, Tokyo (JP); Yuji Arai, Tokyo (JP); Mitsuhiro Numata, Tokyo (JP); Toru Takayama, Tokyo (JP); Masanao Seo, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 319 days.

(21) Appl. No.: 14/239,829

(22) PCT Filed: Aug. 17, 2012

(86) PCT No.: PCT/JP2012/070888
§ 371 (c)(1),
(2), (4) Date: Feb. 20, 2014

(87) PCT Pub. No.: WO2013/027666
PCT Pub. Date: Feb. 28, 2013

(65) Prior Publication Data
US 2014/0205487 A1    Jul. 24, 2014

(30) Foreign Application Priority Data

Aug. 22, 2011 (JP) ................. 2011-180207

(51) Int. Cl.
| | | |
|---|---|---|
| *C22C 38/32* | (2006.01) | |
| *C22C 38/00* | (2006.01) | |
| *C22C 38/28* | (2006.01) | |
| *C22C 38/02* | (2006.01) | |
| *C22C 38/04* | (2006.01) | |
| *C22C 38/06* | (2006.01) | |
| *C22C 38/22* | (2006.01) | |
| *C22C 38/24* | (2006.01) | |
| *C22C 38/26* | (2006.01) | |
| *C21D 8/10* | (2006.01) | |
| *C21D 9/08* | (2006.01) | |
| *C21D 9/00* | (2006.01) | |

(52) U.S. Cl.
CPC .............. *C22C 38/32* (2013.01); *C21D 8/105* (2013.01); *C21D 9/08* (2013.01); *C21D 9/085* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C22C 38/28* (2013.01); *C21D 9/00* (2013.01); *Y02P 10/212* (2015.11)

(58) Field of Classification Search
CPC ..... C22C 38/00; C22C 38/001; C22C 38/002; C22C 38/02; C22C 38/04; C22C 38/06; C22C 38/22; C22C 38/24; C22C 38/26; C22C 38/28; C22C 38/32; C21D 8/105; C21D 9/00; C21D 9/08; C21D 9/085; Y02P 10/212

See application file for complete search history.

(56) References Cited

U.S. PATENT DOCUMENTS

| | | | | |
|---|---|---|---|---|
| 7,648,587 | B2 * | 1/2010 | Kushida | .................. C22C 38/02 |
| | | | | 148/318 |
| 9,175,371 | B2 * | 11/2015 | Numata | ................ C22C 38/001 |
| 2006/0018783 | A1 | 1/2006 | Itou et al. | |

FOREIGN PATENT DOCUMENTS

| | | |
|---|---|---|
| CA | 2752741 | 10/2010 |
| CA | 2766028 | 12/2010 |
| CA | 2798852 | 12/2011 |
| CN | 101892443 | 11/2010 |
| EP | 1712651 | 10/2006 |
| EP | 1785501 | 5/2007 |
| EP | 1790748 | 5/2007 |
| EP | 2133443 | 12/2009 |
| JP | 07-197125 | 8/1995 |
| JP | 09-67624 | 3/1997 |
| JP | 2001-73086 | 3/2001 |
| JP | 2001-131698 | 5/2001 |
| JP | 2001-172739 | 6/2001 |
| JP | 2004-332059 | 11/2004 |
| UA | 90947 | 6/2010 |

OTHER PUBLICATIONS

Toshiharu, Abe, English machine translation of JP 2001-172739, Jun. 2001, whole document.*
Jones, Clifford, "Yield Strength", Dictionary of Oil and Gas Production, 2012, Whittles Publishing, p. 1-3.*

* cited by examiner

*Primary Examiner* — Roy King
*Assistant Examiner* — Caitlin Kiechle
(74) *Attorney, Agent, or Firm* — Clark & Brody

(57) ABSTRACT

To provide an oil-well steel pipe having excellent SSC resistance. The oil-well steel pipe according to the present invention contains, by mass percent, C: 0.15 to 0.35%, Si: 0.1 to 0.75%, Mn: 0.1 to 1.0%, Cr: 0.1 to 1.7%, Mo: 0.1 to 1.2%, Ti: 0.01 to 0.05%, Nb: 0.010 to 0.030%, Al: 0.01 to 0.1%, P: at most 0.03%, S: at most 0.01%, N: at most 0.007%, and O: at most 0.01%, the balance being Fe and impurities. The Ti content and the Nb content in a residue obtained by bromine-methanol extraction satisfy equation (1):

$$100 \times [Nb]/([Ti]+[Nb]) \leq 27.5 \qquad (1)$$

where the Ti content (mass %) and the Nb content (mass %) in the residue are substituted for [Ti] and [Nb].

5 Claims, 1 Drawing Sheet

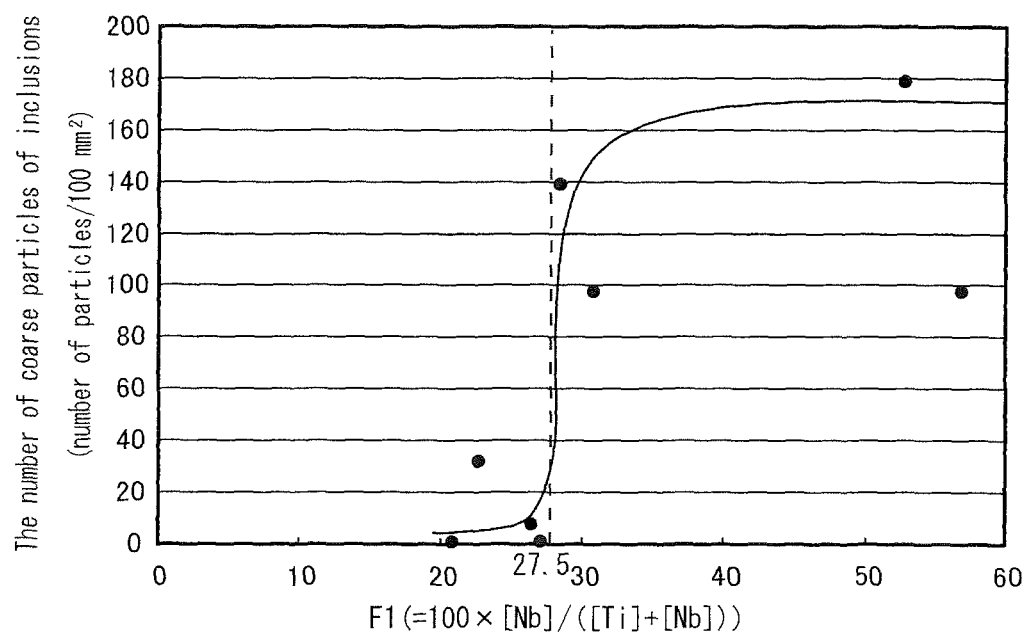

OIL-WELL STEEL PIPE HAVING EXCELLENT SULFIDE STRESS CRACKING RESISTANCE

TECHNICAL FIELD

The present invention relates to a steel pipe and, in particular, to an oil-well steel pipe.

BACKGROUND ART

Oil-well steel pipes are used as a casing or a tubing for an oil well or a gas well. An oil well and a gas well are hereinafter referred to simply as an "oil well". With increasing depth of oil wells, oil well pipes are required to have a higher strength. Conventionally, oil well pipes of 80 ksi grade (having a yield stress of 80 to 95 ksi, that is, 551 to 654 MPa) or 95 ksi grade (having a yield stress of 95 to 110 ksi, that is, 654 to 758 MPa) have been mainly used. However, there has recently been increasing use of oil well pipes of 110 ksi grade (having a yield stress of 110 to 125 ksi, that is, 758 to 861 MPa).

Many of the deep oil wells recently developed contain corrosive hydrogen sulfide. In such an environment, if the strength of steel is increased, the susceptibility of steel to sulfide stress cracking (herein after referred to as "SSC") is increased. In the case of increasing the strength of an oil well pipe used in an environment containing hydrogen sulfide, therefore, a higher sulfide stress cracking resistance (SSC resistance) is desirable.

For example, techniques described below have been proposed as a technique to improve the SSC resistance of steel. The proposed techniques include:

increasing the proportion of martensite in the steel microstructure to 80% or higher;

performing tempering on steel at a high temperature to make carbides in steel spherical;

acquiring higher cleanliness of steel;

making the steel micro-structure finer; and suppressing the diffusion coefficient of hydrogen and the dislocation density in steel.

Further, the SSC resistance of steel can be improved by controlling nonmetallic inclusions. JP2001-131698A (Patent Document 1), JP2004-332059A (Patent Document 2) and JP2001-73086A (Patent Document 3) propose techniques to improve the SSC resistance by controlling nonmetallic inclusions.

Patent Document 1 discloses particulars described below. In a case where Ti nitride is coarsely formed even in a low alloy steel, the Ti nitride coarsely formed acts as a pitting starting point. Generation of pitting induces SSC. Therefore the Ti nitride is made finer. In this case, the SSC resistance of the steel is improved.

Patent Document 2 discloses particulars described below. In a low alloy steel, Nb-based inclusions satisfying the following expression are contained at a rate of ten or more particles per 1 mm² sectional area.

$$a_{NB} \times b_{NB} \leq 150$$

In this expression, $a_{NB}$ is the length of the major axis (μm) of a Nb-based inclusion, and $b_{NB}$ is the content (mass %) of Nb in the Nb-based inclusion. Nb-based inclusions having $a_{NB}$ smaller than 1 μm are ignored. In this case, the occurrence of pitting in the low alloy steel is suppressed and the SSC resistance is improved.

Patent Document 3 discloses particulars described below. The chemical composition of a steel satisfies the following expression:

$$(1+4.3\times[V]+3.4\times[Nb]+2.5\times[Ti])/(7.8[Cr]\times[Mo])>1$$

For [V], [Nb], [Ti], [Cr] and [Mo], the contents of the corresponding elements (in wt %) are substituted. In this case, the generation of $M_{23}C_6$ carbide is suppressed. Further, the SSC resistance of the steel is improved by making the carbide spherical.

SUMMARY OF INVENTION

According to Patent Document 1, inclusions are removed at the time of casting by causing floating of the inclusions with a tundish heater in order to suppress coarse Ti nitride. However, floating and removal of Ti nitride at the time of casting is somewhat difficult in actual operation. Further, it is said that performing only floating and removal of Ti nitride is insufficient for suppressing the generation of pitting.

According to Patent Document 2, only the pitting resistance of an as-rolled steel member is evaluated. Patent Document 2 does not completely clarify what effect is obtained with respect to the SSC resistance relating closely to the strength of a product.

In the composition of the steel disclosed in Patent Document 3, the content of one of the elements Cr and Mo is reduced as low as possible while the Nb content and/or the Ti content is increased. This may in some cases cause unstable hardenability. Further, SSC due to pitting, resulting from Nb-based inclusions and/or Ti-based inclusions, was not sufficiently considered.

An objective of the present invention is to provide an oil-well steel pipe having excellent SSC resistance.

The oil-well steel pipe according to the present invention contains, by mass percent, C, 0.15 to 0.35%, Si: 0.1 to 0.75%, Mn: 0.1 to 1.0%, Cr: 0.1 to 1.7%, Mo: 0.1 to 1.2%, Ti: 0.01 to 0.05%, Nb: 0.010 to 0.030%, and Al: 0.01 to 0.1%, the balance being Fe and impurities. The contents of P, S, N and O in the impurities are P: at most 0.03%, S: at most 0.01%, N: at most 0.007%, and O: at most 0.01%. The Ti content and the Nb content in a residue extracted by using a bromine-methanol solution satisfy expression (1):

$$100\times[Nb]/([Ti]+[Nb])\leq 27.5. \tag{1}$$

For [Ti] and [Nb], the Ti content (mass %) and the Nb content (mass %) in the residue are substituted.

The oil-well steel pipe according to the present invention has excellent SSC resistance.

The above-described oil-well steel pipe may contain V: at most 0.50% in place of some part of Fe.

The above-described oil-well steel pipe may contain B: at most 0.0050% in place of some part of Fe.

The above-described oil-well steel pipe may contain Ca: at most 0.0050% in place of some part of Fe.

BRIEF DESCRIPTION OF DRAWING

FIG. 1 is a graph showing the relationship between the Ti content and the Nb content in a residue extracted by using a bromine-methanol solution and the number of coarse particles of carbo-nitrides and nitrides in steel (coarse inclusions, i.e. those having an inclusion length of 20 μm or more).

DESCRIPTION OF EMBODIMENTS

The present inventors examined and studied the SSC resistance of oil-well steel pipes to obtain the findings described below.

(A) Carbo-nitrides and nitrides in the inclusions formed in a low alloy oil-well steel pipe having the above-described chemical composition cause a reduction in SSC resistance as compared to carbides. When the carbides are coarsened so that the crystalline structure of the carbides becomes the $M_{23}C_6$ type, the carbides cause a reduction in SSC resistance of the steel. In the oil-well steel pipe having the above-described chemical composition, however, the contents of alloying elements are small. Therefore, the carbides are not easily coarsened and the crystalline structure of the carbides does not easily become the $M_{23}C_6$ type. Therefore, the carbides do not easily affect the SSC resistance.

(B) Ti and Nb form carbo-nitrides or nitrides. Fine Carbo-nitrides and nitrides containing Ti and Nb cause crystal grains to be finer. It is, therefore, preferable to contain certain amounts of Ti and Nb. On the other hand, if the number of coarse particles of carbo-nitrides and nitrides are increased, the SSC resistance of the steel is lowered. Therefore, while the carbo-nitrides and nitrides in the steel are necessary for making the crystal grains finer, it is preferable to suppress the number of coarse particles of the carbo-nitrides and nitrides in order to improve the SSC resistance.

(C) In the low alloy oil-well steel pipe having the above-described chemical composition, if the Ti content and the Nb content in a residue extracted by using a bromine-methanol solution satisfy expression (1), the SSC resistance of the oil-well steel pipe is improved.

$$100 \times [Nb]/([Ti]+[Nb]) \leq 27.5 \quad (1)$$

For [Ti] and [Nb], the Ti content (mass %) and the Nb content (mass %) in the residue are substituted.

FIG. 1 is a graph showing the relationship between an F1 value in a residue obtained by using bromine-methanol extraction and the number of particles of carbo-nitrides and nitrides having an inclusion length of 20 μm or more. F1 is defined by the following expression:

$$F1=100 \times [Nb]/([Ti]+[Nb]).$$

FIG. 1 was a result of a method described below. As shown in examples described later, a plurality of steel pipes having a plurality of chemical compositions were produced. To determine the F1 value from each steel pipe, a specimen (1 g) for bromine-methanol extraction was sampled. Further, to determine the number of particles of carbo-nitrides and nitrides in the steel, a specimen for microscopic observation was sampled from an arbitrary position in each steel pipe.

The specimen for bromine-methanol extraction was dissolved by using a methanol solution containing 10 volume percent (vol %) of bromine (hereinafter referred to as "bromine-methanol solution") to obtain a residue. More specifically, the specimen for bromine-methanol extraction was immersed in the bromine-methanol solution and dissolved. The bromine-methanol solution in which the specimen was dissolved was filtered by using a filter. A residue attached to the filter. The filter to which the residue attached was dissolved by using $H_2SO_4$ to obtain the residue. The residue substantially contained carbo-nitrides, nitrides and oxides.

The residue was decomposed by a pressurized acidolysis method. In the pressurized acidolysis method, the residue and an acid for decomposition were contained in a polytetrafluoroethylene (PTFE) container. As the acid for decomposition, a mixed acid containing HCl, $HNO_3$ and $H_2O$ ($HCl:HNO_3:H_2O=1:1:8$) was used. The container was hermetically sealed and heated at 220° C. for 8 hours to decompose the residue in the container. The decomposed residue was left to cool. The resulted acid solution was then fixed to a certain volume and the Ti content and the Nb content were analyzed by radiofrequency inductive coupled plasma (ICP) emission spectrochemical analysis method. The above-described F1 value was determined based on the obtained Ti and Nb contents. Most of the carbo-nitrides and nitrides formed in the above-described chemical composition are either a Ti-based inclusion or an Nb-based inclusion. Therefore, the F1 value is thought to be a measure indicating the proportion of the Nb content in the carbo-nitrides and nitrides.

Further, by using the specimen for microscopic observation, the number of particles of the carbo-nitrides and nitrides in the steel were determined by a method described below. The surface of the specimen was first polished. An arbitrary region (100 mm²) in the polished surface was selected. The selected region was observed through a 200 to 1000× optical microscope.

The size of each of the carbo-nitrides and nitrides was determined by a method described below. The length of the major axis of each of the carbo-nitrides and nitrides was defined as "inclusion length" to be used as a measure for the size of the carbo-nitrides and nitrides. When the distance between inclusions (carbo-nitrides and nitrides) adjacent to each other is 40 μm or less, the inclusions were regarded as one continuous particle of inclusions.

Thereafter, the number of particles of the carbo-nitrides and nitrides having an inclusion length of 20 μm or more (hereinafter referred to as "coarse inclusions or coarse particles of inclusions") in the region was determined. The number $LN_{100}$ of coarse particles of inclusions per 100 mm² was determined based on the following expression:

$LN_{100}$=the number of coarse particles of inclusions measured/(the area of the region (mm²))×100 (mm²).

By using the obtained measured value, FIG. 1 showing the relationship between the number $LN_{100}$ of coarse particles of inclusions and F1 was prepared.

Referring to FIG. 1, the number $LN_{100}$ of coarse particles of inclusions was much smaller when the F1 value was 27.5 or less than when the F1 value was larger than 27.5. Therefore, excellent SSC resistance can be obtained when the F1 value is 27.5 or less.

An oil-well steel pipe according to the present invention was completed based on the above-described findings. An oil-well steel pipe in the present invention will be described below in detail. In the following description, "%" in the expression of the contents of elements constituting a chemical composition denotes "mass %".

[Chemical Composition]

The oil-well steel pipe according to the present invention has a chemical composition described below.

C: 0.15 to 0.35%

Carbon (C) increases hardenability and increases the strength of steel. On the other hand, if the C content is excessively high, the susceptibility of steel to quench cracking is increased. Further, the toughness of steel is lowered. Accordingly, the C content is 0.15 to 0.35%. Regarding the lower limit of the C content, the C content is preferably higher than 0.15%, more preferably equal to or higher than 0.20%, further preferably equal to or higher than 0.22%. Regarding the upper limit of the C content, the C content is preferably lower than 0.35%, more preferably equal to or lower than 0.33%, further preferably equal to or lower than 0.32%.

Si: 0.1 to 0.75%

Silicon (Si) deoxidizes steel. On the other hand, if the Si content is excessively high, the toughness and hot workability of steel are lowered. Accordingly, the Si content is 0.1 to 0.75%. Regarding the lower limit of the Si content, the Si content is preferably higher than 0.1%, more preferably equal to or higher than 0.15%, further preferably equal to or higher than 0.20%. Regarding the upper limit of the Si content, the Si content is preferably lower than 0.75%, more preferably equal to or lower than 0.50%, further preferably equal to or lower than 0.35%.

Mn: 0.1 to 1.0%

Manganese (Mn) increases the hardenability of steel and increases the strength of steel. On the other hand, if the Mn content is excessively high, pitting occurs easily in steel. Further, Mn segregates at grain boundaries to lower the toughness and SSC resistance of steel. Accordingly, the Mn content is 0.1 to 1.0%. Regarding the lower limit of the Mn content, the Mn content is preferably higher than 0.1%, more preferably equal to or higher than 0.15%, further preferably equal to or higher than 0.2%. Regarding the upper limit of the Mn content, the Mn content is preferably lower than 1.0%, more preferably equal to or lower than 0.7%, further preferably equal to or lower than 0.6%.

Cr: 0.1 to 1.7%

Chromium (Cr) increases the hardenability and temper softening resistance of steel. Therefore Cr facilitates execution of high-temperature tempering on steel. Cr further improves the SSC resistance of steel. On the other hand, if the Cr content is excessively high, $M_7C_3$-based carbides and $M_{23}C_6$-based carbides are formed and the SSC resistance of steel is lowered. Accordingly, the Cr content is 0.1 to 1.7%. Regarding the lower limit of the Cr content, the Cr content is preferably higher than 0.1%, more preferably equal to or higher than 0.3%, further preferably equal to or higher than 0.4%. Regarding the upper limit of the Cr content, the Cr content is preferably lower than 1.7%, more preferably equal to or lower than 1.5%, further preferably equal to or lower than 1.2%.

Mo: 0.1 to 1.2%

Molybdenum (Mo) increases the hardenability and temper softening resistance of steel. Therefore Mo facilitates execution of high-temperature tempering on steel. Mo further improves the SSC resistance of steel. On the other hand, if the Mo content is excessively high, the above-described effects are saturated. Accordingly, the Mo content is 0.1 to 1.2%. Regarding the lower limit of the Mo content, the Mo content is preferably higher than 0.1%, more preferably equal to or higher than 0.2%, further preferably equal to or higher than 0.4%. Regarding the upper limit of the Mo content, the Mo content is preferably lower than 1.2%, more preferably equal to or lower than 1.0%, further preferably equal to or lower than 0.9%.

Ti: 0.01 to 0.05%

Titanium (Ti) bonds to N in steel to form Ti nitride and/or Ti carbo-nitride. Ti nitride and/or Ti carbo-nitride causes crystal grains of steel to be finer. Further, if boron (B) is contained, Ti suppresses the formation of B nitride. Therefore the improvement in hardenability due to B is increased. On the other hand, if the Ti content is excessively high, Ti nitride and/or Ti carbo-nitride is coarsely formed, resulting in a reduction in SSC resistance of steel. Accordingly, the Ti content is 0.01 to 0.05%. Regarding the lower limit of the Ti content, the Ti content is preferably higher than 0.01%, more preferably equal to or higher than 0.011%, further preferably equal to or higher than 0.012%. Regarding the upper limit of the Ti content, the Ti content is preferably lower than 0.05%, more preferably equal to or lower than 0.03%, further preferably equal to or lower than 0.025%.

Nb: 0.010 to 0.030%

Niobium (Nb) bonds to C and N to form Nb carbo-nitride and Nb nitride. Nb and Ti or Al may further form a composite carbo-nitride. These inclusions, if they are fine, cause crystal grains to be finer. On the other hand, if the Nb content is excessively high, coarse Nb-based inclusions are produced in excess to lower the SSC resistance of steel. Accordingly, the Nb content is 0.010 to 0.030%. Regarding the lower limit of the Nb content, the Nb content is preferably higher than 0.010%, more preferably equal to or higher than 0.011%, further preferably equal to or higher than 0.012%. Regarding the upper limit of the Nb content, the Nb content is preferably lower than 0.03%, more preferably equal to or lower than 0.020%, further preferably equal to or lower than 0.015%.

Al: 0.01 to 0.1%

Aluminum (Al) deoxidizes steel. On the other hand, if the Al content is excessively high, Al-based oxides are coarsely formed to reduce the toughness of steel. Accordingly, the Al content is 0.01 to 0.1%. Regarding the lower limit of the Al content, the Al content is preferably higher than 0.01%, more preferably equal to or higher than 0.015%, further preferably equal to or higher than 0.020%. Regarding the upper limit of the Al content, the Al content is preferably lower than 0.1%, more preferably equal to or lower than 0.07%, further preferably equal to or lower than 0.05%. "Al content" referred to in the present specification denotes the content of acid-soluble Al (sol. Al).

The balance in the oil-well steel pipe according to the present invention is Fe and impurities. "Impurities" in the present specification denotes elements mixed from an ore or scraps used as a raw material for steel or a production process environment or the like. In the present invention, the contents of P, S, N and O as impurities are suppressed as described below.

P: 0.03% or Less

Phosphorous (P) is an impurity. P segregates at grain boundaries to make the grain boundaries brittle. Therefore P lowers the toughness and SSC resistance of steel. For this reason, it is preferable to set the P content as low as possible. The P content is equal to or lower than 0.03%. The P content is preferably lower than 0.03%, more preferably equal to or lower than 0.02%, further preferably equal to or lower than 0.015%.

S: 0.01% or Less

Sulfur (S) is an impurity. S bonds to Mn to form an Mn-based sulfide, which is easily soluble. Therefore S causes reductions in toughness and SSC resistance of steel. For this reason, it is preferable to set the S content as low as possible. The S content is equal to or lower than 0.01%. The S content is preferably lower than 0.01%, more preferably equal to or lower than 0.05% or less, further preferably equal to or lower than 0.002%.

N: 0.007% or Less

Nitrogen (N) is an impurity. N coarsens Nb-based inclusions and/or Ti-based inclusions. The coarsened Nb-based inclusions and Ti-based inclusions cause a reduction in pitting resistance of steel and, hence, a reduction in SSC resistance. Therefore it is preferable to set the N content as low as possible. The N content is equal to or lower than 0.007%. The N content is preferably lower than 0.007%, more preferably equal to or lower than 0.005%. N may be contained at least 0.001%.

O: 0.01% or Less

Oxide (O) is an impurity. O forms oxides in coarse form to reduce the pitting resistance of steel. Therefore it is preferable to set the O content as low as possible. The O content is equal to or lower than 0.01%. The O content is preferably less than 0.01%, more preferably equal to or lower than 0.003%, and further more preferably equal to or lower than 0.0015%.

[Concerning Optional Elements]

The oil-well steel pipe according to the present invention may further contain V in place of some part of Fe.

V: 0.50% or Less

Vanadium (V) is an optional element. V forms fine carbides in a tempering process to improve the temper softening resistance. Tempering at high temperatures is thereby enabled to improve the toughness and SSC resistance of steel. If even a small amount of V is contained, the above-described effect can be obtained. On the other hand, if the V content is excessively high, the above-described effect is saturated. Accordingly, the V content is 0.50% or less. Regarding the preferable lower limit of the V content, the V content is preferably equal to or higher than 0.01%, more preferably equal to or higher than 0.03%, further preferably equal to or higher than 0.05%. Regarding the upper limit of the V content, the V content is preferably lower than 0.50%, more preferably equal to or lower than 0.2%, further preferably equal to or lower than 0.15%.

The oil-well steel pipe according to the present invention may further contain B in place of some part of Fe.

B: 0.0050% or less

Boron (B) is an optional element. B increases the hardenability of steel. If even a small amount of B is contained, the above-described effect can be obtained. On the other hand, if the B content is excessively high, the above-described effect is saturated. Accordingly, the B content is 0.0050% or less. Regarding the preferable lower limit of the B content, the B content is preferably equal to or higher than 0.0001%, more preferably equal to or higher than 0.0005%. Regarding the lower limit of the C content, the B content is preferably lower than 0.0050%, more preferably equal to or lower than 0.0025%.

The oil-well steel pipe according to the present invention may further contain Ca in place of some part of Fe.

Ca: 0.0050% or less

Calcium (Ca) is an optional element. Ca suppresses the production of coarse Al-based inclusions and forms fine Al—Ca-based acid sulfides. In the case of producing a steel product (a slab or a round billet or the like) by continuous casting, therefore, Ca inhibits clogging of a nozzle of a continuous casting apparatus with coarse Al-based inclusions. If even a small amount of Ca is contained, the above-described effect can be obtained. On the other hand, if the Ca content is excessively high, the pitting resistance of steel is lowered. Accordingly, the Ca content is 0.00500 or less. Regarding the preferable lower limit of the Ca content, the Ca content is preferably equal to or higher than 0.0003%, more preferably equal to or higher than 0.0005%. Regarding the upper limit of the Ca content, the Ca content is preferably lower than 0.0050%, more preferably equal to or lower than 0.0030%.

The chemical composition of the oil-well steel pipe according to the present invention may satisfy the following expression (A):

$$(1+4.3\times[V]+3.4\times[Nb]+2.5\times[Ti])/(7.8\times[Cr]\times[Mo])\leq 1. \quad (A)$$

The contents (mass %) of the elements corresponding to the element symbols in [ ] are substituted for the element symbols in [ ]. If no V is contained, [0] is substituted for [V].

In the steel disclosed in JP2001-73086A (Patent Document 3), the left-hand side of the above expression (A) is larger than 1 as a condition. In contrast, with respect to the oil-well steel pipe according to the present invention, the left-hand side of the above expression may be 1 or less. When the Ti content and the Nb content are lower, it is easier to control the number of coarse particles of carbo-nitrides and nitrides, and the SSC resistance is improved. With respect to the oil-well steel pipe according to the present invention, therefore, it is preferred that the left-hand side of expression (A) be 1 or less. More preferably, the left-hand side of expression (A) is 0.85 or less. Further preferably, the left-hand side of expression (A) is 0.65 or less.

[Concerning Expression (1)]

Further, with respect to the oil-well steel pipe according to the present invention, the Ti content and the Nb content in a residue obtained by means of bromine-methanol extraction satisfies expression (1).

$$100\times[Nb]/([Ti]+[Nb])\leq 27.5 \quad (1)$$

For [Ti] and [Nb], the Ti content (mass %) and the Nb content (mass %) in the residue are substituted.

As described above, in the chemical composition according to the present invention, carbides do not easily affect the SSC resistance. In the oil-well steel pipe according to the present invention, coarse carbo-nitrides and nitrides cause a reduction in SSC resistance. Carbo-nitrides and nitrides in fine form in the steel make crystal grains finer. Even if the number of fine particles of carbo-nitrides and nitrides is small, crystal grains are made finer to some extent. On the other hand, the number of coarse particles of carbo-nitrides and nitrides is increased, the SSC resistance of the steel is lowered, as described above. Therefore, excellent SSC resistance can be obtained if the number of coarse particles of carbo-nitrides and nitrides is suppressed.

Bromine-methanol extraction is performed as described below. A sample is taken from an arbitrary position in the oil-well steel pipe. The shape of the sample is not restrictively specified. The weight of the sample is 1 g. The sample is immersed in a methanol solution containing 10 volume percent (vol %) of bromine (hereinafter referred to as "bromine-methanol solution") to be dissolved. The bromine-methanol solution in which the sample is dissolved is filtered by using a filter (e.g., a Nuclepore filter having a pore size of 0.2 μm). At this time, a residue attaches to the filter. The filter to which the residue has attached is dissolved by using $H_2SO_4$ to extract the residue. Carbides in the steel is dissolved in the bromine-methanol solution. Therefore the residue substantially contains carbo-nitrides, nitrides and oxides.

The residue is decomposed, for example, by a pressurized acidolysis method. In the pressurized acidolysis method, the residue and an acid for decomposition are contained in a container (e.g., a PTFE container). The acid for decomposition is, for example, a mixed acid containing HCl, $HNO_3$ and $H_2O(HCl:HNO_3:H_2O=1:1:8)$. The container is hermetically sealed and heated at 220° C. for 8 hours. By the above-described process, the residue is decomposed in the container.

An alkali fusion method also can be used to decompose the residue instead of the pressurized acidolysis method mentioned above. In the alkali fusion method, the residue and a fusing agent are put in a platinum crucible. The fusing agent is, for example, $LiBO_2$. The platinum crucible is heated at 1000° C. in an electric furnace to decompose the residue in the platinum crucible. The residue can be easily dissolved in an acid solution.

The residue decomposed by the pressurized acidolysis method is cooled by unforced cooling. The resulted acid solution is then fixed to a certain volume and the Ti content and the Nb content are analyzed by an ICP emission spectrochemical analysis method. The F1 value is determined based on the Ti content and the Nb content obtained by the above-described process.

$$F1=100\times[Nb]/([Ti]+[Nb])$$

As described above, in the chemical composition in the present invention, most of the carbo-nitrides and nitrides are Ti-based inclusions and Nb-based inclusions. Accordingly, F1 is a measure indicating the Nb concentration in the carbo-nitrides and nitrides.

As shown in FIG. 1, when the F1 value is 27.5 or less, the number of coarse particles of inclusions in the steel (the number of particles of carbo-nitrides and nitrides having an inclusion length of 20 μm or more) can be reduced. As a result, the SSC resistance of the steel is improved.

In the oil-well steel pipe in the present invention, the number of coarse particles of inclusions is preferably 35 particles/100 mm$^2$ or less.

[Other Characteristics of Oil-Well Steel Pipe in the Present Invention]

[Yield Strength]

Preferably, the oil-well steel pipe in the present invention has an yield strength of 654 MPa or more. "Yield strength" referred to here designates 0.2% yield stress. More preferably, the yield strength of the oil-well steel pipe is 758 MPa or more.

[Preferable Yield Ratio]

The oil-well steel pipe according to the present invention has high strength. Therefore, if the tensile strength is excessively high relative to the yield strength, the SSC resistance is lowered. Accordingly, a preferable yield ratio is 87.0% or more. The yield ratio YR (%) is the ratio of the yield strength YS to the tensile strength TS (YR=YS/TS×100).

[Prior Austenite Grain Size]

A preferable prior austenite grain size number of the oil-well steel pipe according to the present invention is 7.5 or larger. The prior austenite grain size number referred to in the present specification is measured in accordance with ASTM E112. When the prior austenite grain size number is smaller than 7.5, the toughness and SSC resistance of the steel are lowered.

[Production Process]

An example of the production process of the oil-well steel pipe according to the present invention will be described. The production process is not limited to the one described below.

[Round Billet Production Process]

First, primary refining is performed on pig iron with a converter or an electronic furnace. Further, secondary refining is performed on molten steel that has undergone primary refining, and alloying elements are added to the molten steel. Molten steel having the above-described chemical composition is produced by this process.

The molten steel is poured into a tundish, and a slab or a round billet or the like is produced by a continuous casting process. Alternatively, an ingot is produced from the molten steel by an ingot-making process. The slab or the like, or the ingot is subjected to blooming to produce a round billet.

Preferably, in the case of producing a slab or a round billet or the like by a continuous casting process, the temperature of the molten steel in the tundish is held at 1520° C. or higher. In this case, inclusions, i.e., impurities, in the molten steel coagulate and float up in the tundish. Removal of the inclusions is thus enabled.

Preferably, the cooling rate for the casted or poured slab, round billet or the like, or ingot is 50° C./minute or higher. In this case, coarsening of the inclusions is suppressed.

[Hot Working Process]

The round billet is subjected to hot working to be formed into a hollow shell. First, the round billet is heated in a heating furnace. Hot working is performed on the round billet extracted from the heating furnace to produce a hollow shell (a seamless steel pipe). For example, a Mannesmann process is performed as hot working to produce a hollow shell. In this case, piercing-rolling is performed on the round billet with a piercing machine. Hot elongating is further performed on the piercing-rolled round billet with a mandrel mill, reducer, a sizing mill or the like to form a hollow shell. A hollow shell may be formed from the round billet by a different hot working process.

Preferably, in the heating furnace in the hot working process, the round billet heating temperature and heating time satisfy the following expression (2):

$$(T+273)\times(20+\log(t))\leq 30600. \quad (2)$$

A heating temperature (° C.) is substituted for T in expression (2), and a heating time (hr) is substituted for t.

In some cases, the heating furnace is divided into a plurality of zones. The heating furnace is divided into a preheating zone, a heating zone and a soaking zone, for example. The zones are disposed in a row, and the round billet is heated while being moved in order of the preheating zone, the heating zone and the soaking zone. The heating temperature and heating time for one of the zones may be different from those for the other zones. In a case where the heating furnace is divided into a plurality of zones, the average of the heating temperatures of the zones is defined as the heating temperature T (° C.) of the heating furnace. Further, the value of the accumulation of the heating times for the zones is defined as the heating time t (hr) of the heating furnace.

$F2=(T+273)\times(20+\log(t))$ is defined. When the value F2 is larger than 30600, the F1 value is excessively large, exceeding 27.5. Therefore the SSC resistance of the steel is lowered. If the value F2 satisfies expression (2), excellent SSC resistance can be obtained. The lower limit of the value F2 is preferably equal to or larger than 28500, more preferably equal to or larger than 29200. If the value F2 is excessively small, a temperature of the round billet suitable for piercing cannot be easily reached. The round billet soaking temperature (the temperature in the soaking zone) is preferably equal to or higher than 1200° C.

[Heat Treatment Process]

The hollow shell after hot working is cooled to normal temperature. After cooling the hollow shell to normal temperature, quenching and tempering are performed to produce an oil-well steel pipe. In quenching, the quenching temperature is equal to or higher than $A_{C3}$ point. In tempering, the tempering temperature is equal to or lower than $A_{C1}$ point. By quenching and tempering, the prior austenite grain size number of the material pipe is adjusted to 7.5 or a larger value.

The hollow shell having a surface temperature equal to or higher than $A_{C3}$ point after hot working may be directly subjected to quenching without being cooled to normal temperature. Further, the hollow shell after hot working may alternatively be inserted in a heating furnace immediately after the hot working and subjected to complementary heating (soaking) to a temperature equal to or higher than $A_{C3}$ point. In this case, quenching is performed on the hollow shell after complementary heating. Quenching and tempering may be performed a certain number of times. More specifically, on the hollow shell on which quenching and tempering have been performed, quenching and tempering may be further performed.

The oil-well steel pipe produced by the above-described production process satisfies expression (1). Therefore the oil-well steel pipe has excellent SSC resistance.

EXAMPLES

Oil-well steel pipes having various chemical compositions were produced under various production conditions. The SSC resistances of the produced oil-well steel pipes were evaluated.

[Production Process of Oil-Well Steel Pipe]

Molten steels as steels A to J having chemical compositions shown in Table 1 were produced.

TABLE 1

| Steel | Chemical components (in percent by mass, the balance being Fe and impurities) | | | | | | | | | | | | | | |
|---|---|---|---|---|---|---|---|---|---|---|---|---|---|---|---|
| symbol | C | Si | Mn | Cr | Mo | Ti | Nb | Al | P | S | N | O | V | B | Ca |
| A | 0.27 | 0.28 | 0.44 | 0.50 | 0.69 | 0.015 | 0.012 | 0.039 | 0.006 | 0.0007 | 0.0028 | 0.0012 | 0.09 | 0.0012 | 0.0011 |
| B | 0.27 | 0.29 | 0.46 | 1.04 | 0.69 | 0.013 | 0.014 | 0.025 | 0.012 | 0.0005 | 0.0041 | 0.0010 | 0.09 | 0.0011 | 0.0014 |
| C | 0.26 | 0.28 | 0.46 | 1.03 | 0.68 | 0.013 | 0.013 | 0.026 | 0.011 | 0.0005 | 0.0044 | 0.0011 | 0.09 | 0.0011 | 0.0014 |
| D | 0.28 | 0.30 | 0.48 | 0.51 | 0.67 | 0.018 | 0.011 | 0.035 | 0.010 | 0.0009 | 0.0038 | 0.0014 | 0.10 | 0.0012 | 0.0012 |
| E | 0.27 | 0.28 | 0.49 | 0.51 | 0.69 | 0.019 | 0.012 | 0.041 | 0.010 | 0.0006 | 0.0030 | 0.0009 | 0.10 | 0.0013 | 0.0011 |
| F | 0.27 | 0.31 | 0.49 | 1.05 | 0.71 | 0.015 | 0.028 | 0.041 | 0.011 | 0.0006 | 0.0038 | 0.0012 | 0.09 | 0.0013 | 0.0012 |
| G | 0.28 | 0.31 | 0.48 | 1.04 | 0.69 | 0.014 | 0.027 | 0.041 | 0.010 | 0.0007 | 0.0038 | 0.0017 | 0.09 | 0.0012 | 0.0011 |
| H | 0.27 | 0.28 | 0.46 | 1.02 | 0.68 | 0.013 | 0.012 | 0.042 | 0.006 | 0.0005 | 0.0036 | 0.0012 | 0.09 | — | 0.0010 |
| I | 0.28 | 0.30 | 0.45 | 1.03 | 0.69 | 0.027 | 0.001 | 0.045 | 0.010 | 0.0009 | 0.0048 | 0.0015 | 0.10 | 0.0011 | 0.0020 |
| J | 0.27 | 0.28 | 0.45 | 0.99 | 0.71 | 0.025 | 0.038 | 0.024 | 0.012 | 0.001 | 0.0045 | 0.0020 | 0.09 | 0.0011 | 0.0011 |

Round billets having a diameter of 310 mm were produced by a continuous casting process using molten steels as steels A to J (230 tons). The round billets were heated in the heating furnace at billet heating conditions shown in Table 2. Piercing-rolling after heating was performed on the round billets in a Mannesmann process, thereby producing hollow shells. Quenching was performed on the hollow shells at quenching temperatures shown in Table 2, and tempering was performed on the hollow shells at tempering temperatures shown in Table 2, thereby producing oil-well steel pipes. Quenching and tempering conditions were adjusted so that the yield strengths of the oil-well steel pipes are in the 110 ksi grade (758 to 862 MPa). The outside diameters and the wall thicknesses of the produced oil-well steel pipes were as shown in Table 2.

TABLE 2

| | Billet heating conditions | | | | | | | |
|---|---|---|---|---|---|---|---|---|
| | Preheating zone | | Heating zone | | Soaking zone | | Heating | Accumulated |
| Steel symbol | Temperature (° C.) | Time (hr) | Temperature (° C.) | Time (hr) | Temperature (° C.) | Time (hr) | temperature (° C.) | heating time (hr) |
| A | 1006 | 1.95 | 1211 | 1.20 | 1228 | 2.85 | 1148 | 6.00 |
| B | 1009 | 2.02 | 1214 | 1.17 | 1230 | 3.58 | 1151 | 6.77 |
| C | 1014 | 2.10 | 1221 | 1.47 | 1230 | 3.22 | 1155 | 6.78 |
| D | 1240 | 1.77 | 1298 | 0.62 | 1241 | 0.43 | 1260 | 2.82 |
| E | 1243 | 1.82 | 1298 | 0.57 | 1241 | 0.45 | 1261 | 2.83 |
| F | 1215 | 1.23 | 1284 | 1.00 | 1233 | 0.90 | 1244 | 3.13 |
| G | 1215 | 1.20 | 1281 | 1.02 | 1233 | 0.87 | 1243 | 3.08 |
| H | 1154 | 1.70 | 1217 | 0.83 | 1228 | 0.61 | 1200 | 3.14 |
| I | 1010 | 1.88 | 1216 | 1.24 | 1231 | 2.91 | 1152 | 6.03 |
| J | 1014 | 2.31 | 1222 | 1.08 | 1230 | 3.02 | 1155 | 6.41 |

| | | Finished size | | Process of heat treatment on steel pipe | | |
|---|---|---|---|---|---|---|
| Steel symbol | F2 | Outside diameter (mm) | Wall thickness (mm) | Heat treatment process | Quenching temperature (° C.) | Tempering temperature (° C.) |
| A | 29532.7 | 244.5 | 13.84 | Off-line QT | 920 | 695 |
| B | 29662.5 | 244.5 | 13.84 | Off-line QT | 920 | 705 |
| C | 29747.3 | 244.5 | 13.84 | In-line QT + Off-line QT*[1] | 920 | 705 |
| D | 31342.6 | 250.0 | 16.79 | Off-line QT | 920 | 695 |

TABLE 2-continued

|   |         |       |       |                        |     |     |
|---|---------|-------|-------|------------------------|-----|-----|
| E | 31367.0 | 250.0 | 16.79 | Off-line QT            | 920 | 695 |
| F | 31092.4 | 357.6 | 20.32 | Off-line QT            | 920 | 705 |
| G | 31061.4 | 357.6 | 20.32 | Off-line QT            | 920 | 705 |
| H | 30194.0 | 244.5 | 13.84 | In-line QT*[1] + Off-line QT | 920 | 700 |
| I | 29612.0 | 244.5 | 13.84 | Off-line QT            | 920 | 705 |
| J | 29712.2 | 244.5 | 13.84 | Off-line QT            | 920 | 705 |

*In-line QT: Quenching at 950° C. after soaking, tempering at 560° C.

A "billet heating condition" section in Table 2 contains entries of the heating temperatures (° C.) and the heating times (hr) for the regions (the preheating zone, the heating zone, and the soaking zone) of the heating furnace in the hot working process. A "heating temperature" section contains entries of the averages (° C.) of the heating temperatures for the zones. An "accumulated heating time" section contains entries of the values of the accumulations of the heating times for the zones. An "F2" section contains entries of the F2 values.

A "heat treatment process" section in Table 2 contains entries of heat treatment processes performed on steels A to J. "Off-Line QT" designates the following heat treatment process. The hollow shell after hot working was cooled to normal temperature (25° C.). Quenching was performed by heating the cooled hollow shell to a temperature equal to or higher than $A_{C3}$ point. Tempering was performed at a temperature equal to or lower than $A_{C1}$ point on the hollow shell after quenching.

"In-Line QT" designates the following heat treatment process. The hollow shell after hot working was subjected to soaking (concurrent heating) at a temperature equal to or higher than $A_{C3}$ point in the heating furnace without being cooled to normal temperature. Quenching and tempering were performed on the hollow shell after soaking. The quenching temperature was 950° C. and the tempering temperature was 560° C.

The soaking time for soaking at the quenching temperature in each quenching in "Off-Line QT" and "In-Line QT" was 30 to 90 minutes, and the soaking time for soaking at the tempering temperature in each tempering was 20 to 100 minutes.

"Off-Line QT" was performed on steels A, B, D to G, I, and J. On steels C and H, "In-Line QT" was performed and "Off-Line QT" was thereafter performed. The oil-well steel pipes of steels A to J were produced by the above-described process.

[Testing Method]
[Prior Austenite Grain Size Test]

A specimen was sampled from each steel pipe. The specimen had a surface perpendicular to the longitudinal direction of the steel pipe (hereinafter referred to as "observed surface"). The observed surface of the specimen was mechanically polished. After polishing, a prior austenite grain boundary of the observed surface was caused to appear by using a Picral etching reagent. Thereafter, the prior austenite grain size number of the observed surface was determined in accordance with ASTM E112.

[Tensile Test]

An arched tensile test specimen was sampled from each steel pipe. A cross-sectional surface of the tensile test specimen was arched and the longitudinal direction of each tensile test specimen was parallel to the longitudinal direction of the steel pipe. A tensile test was performed in accordance with the specifications in the API standard 5CT by using the arched tensile test specimens. The yield strength YS (MPa), the tensile strength TS (MPa) and the yield ratio YR (%) of the steel pipe were determined based on the test results.

[F1 Value Evaluation Test]

The Ti content and Nb content in a residue obtained by bromine-methanol extraction were determined by the above-described method. More specifically, a 1 g specimen was sampled from each steel pipe. A residue (inclusions) was obtained by using the sampled specimen and by using the above-described bromine-methanol solution. The residue was decomposed by the above-described pressurized acidolysis method. The Ti content and the Nb content in the residue were determined by the ICP emission spectrochemical analysis method. The F1 value was determined by using the Ti content and the Nb content.

[SSC Resistance Evaluation Test]

A round bar specimen was sampled from each steel pipe. The longitudinal direction of the round bar specimen was parallel to the longitudinal direction of the steel pipe. The outside diameter of a parallel portion of the round bar specimen was 6.35 mm and the length of the parallel portion was 25.4 mm. The SSC resistance of each round bar specimen was evaluated by a constant load test in accordance with the NACE (National Association of Corrosion Engineers) TM0177 Method A. The testing bath was a 5% sodium chloride+0.5% acetic acid aqueous solution of normal temperature in which hydrogen sulfide gas was saturated at 1 atm. Each round bar specimen was immersed in the testing bath for 720 hours while being loaded with a load stress of 645 MPa. The load stress was 85% of the nominal yield stress in the 110 ksi grade. After a lapse of 720 hours from starting immersion, a check was made as to whether or not any rupture was observed in the round bar specimen. When no rupture was observed in the round bar specimen, it was determined that the SSC resistance of the steel was high. When a rupture was observed in the round bar specimen, it was determined that the SSC resistance of the steel was low.

[Test Results]

Table 3 shows the test results.

TABLE 3

| Steel | Mechanical characteristics | | | | Prior γ grain | SSC |
|---|---|---|---|---|---|---|
| symbol | YS (MPa) | TS (MPa) | YR (%) | F1 | size No. | resistance |
| A | 800.5 | 877.7 | 91.2 | 22.7 | 8.4 | NF |
| B | 788.8 | 903.2 | 87.3 | 20.9 | 8.0 | NF |
| C | 827.5 | 922.7 | 89.7 | 27.1 | 8.8 | NF |
| D | 798.8 | 890.5 | 89.7 | 28.5 | 7.5 | F |
| E | 796.0 | 883.9 | 90.1 | 30.8 | 7.6 | F |
| F | 828.1 | 925.3 | 89.5 | 56.9 | 8.6 | F |
| G | 830.8 | 926.0 | 89.7 | 52.8 | 8.3 | F |
| H | 823.2 | 910.8 | 90.4 | 26.4 | 8.9 | NF |
| I | 780.5 | 875.0 | 89.2 | 2.5 | 7.3 | F |
| J | 786.0 | 892.2 | 88.1 | 20.3 | 8.1 | F |

A "YS" section in Table 3 contains entries of yield strengths (MPa). A "TS" section contains entries of tensile strengths (MPa). A "YR" section contains entries of yield ratios (%). An "F1" section contains entries of F1 values. A "prior γ grain size No." section contains entries of prior austenite grain size Nos. A "SSC resistance" section contains entries of SSC resistance evaluation test results. "NF" designates a fact that no rupture was observed in the round bar specimen and excellent SSC resistance was obtained. "F" designates a fact that a rupture was observed in the round bar specimen and the SSC resistance was low.

Referring to Table 3, the chemical compositions of steels A to C, and H were within the scope of the present invention, and relating F1 values satisfied equation (1). As a result, steels A to C had no ruptures observed in the SSC resistance evaluation test and exhibited excellent SSC resistance. Steels A to C, and H had yield strengths YS equal to or higher than 758 MPs, yield ratios YR equal to or higher than 87.0%, and prior austenite grain size Nos. equal to or larger than 7.5.

The chemical compositions of steels D to G were within the scope of the present invention. However, the F2 values did not satisfy equation (2). Therefore steels D to G did not satisfy equation (1). As a result, steels D to G had ruptures observed in the SSC resistance evaluation test and had low SSC resistance.

Steel I had an F2 value satisfying equation (2) but its Nb content was lower than the lower limit in accordance with the present invention. As a result, in steel I, crystal grains were not made sufficiently fine and a rupture was observed in the SSC resistance evaluation test.

Steel J had an F2 value satisfying equation (2) but its Nb content exceeded the upper limit in accordance with the present invention. As a result, a large number of coarse particles of inclusions were formed and a rupture was observed in the SSC resistance evaluation test.

The embodiment of the present invention has been described. However, the above-described embodiment is only illustrative of implementation of the present invention. Therefore the present invention is not limited to the above-described embodiment, and can be implemented by making modifications and changes in the above-described embodiment without departing from the gist of the invention.

The invention claimed is:

1. An oil-well steel pipe containing, by mass percent,
C: 0.15 to 0.35%,
Si: 0.1 to 0.75%,
Mn: 0.1 to 1.0%,
Cr: 0.1 to 1.7%,
Mo: 0.1 to 1.2%,
Ti: 0.01 to 0.05%
Nb: 0.010 to 0.030%, and
Al: 0.01 to 0.1%,
B: at most 0.0050%,
the balance being Fe and impurities, P, S, N and O in the impurities being
P: at most 0.03%,
S: at most 0.01%,
N: at most 0.007%, and
O: at most 0.01%,
wherein the Ti content and the Nb content in a residue obtained by bromine-methanol extraction satisfy equation (1):

$$100\times[Nb]/([Ti]+[Nb])\leq 27.5 \qquad (1)$$

where the Ti content (mass %) and the Nb content (mass %) in the residue are substituted for [Ti] and [Nb],
the oil-well steel pipe has a yield strength of 654 MPa or more and a prior austenite grain size number of 7.5 or larger.

2. The oil-well steel pipe according to claim 1, containing V: at most 0.50% in place of some part of Fe.

3. The oil-well steel pipe according to claim 1, containing Ca: at most 0.0050% in place of some part of Fe.

4. The oil-well steel pipe according to claim 2, containing Ca: at most 0.0050% in place of some part of Fe.

5. The oil-well steel pipe according to claim 1, wherein the C content is 0.20 to 0.35 mass %.

* * * * *